(12) United States Patent
Kodaira

(10) Patent No.: US 7,719,778 B2
(45) Date of Patent: May 18, 2010

(54) OPTICAL AXIS TILTING DEVICE OF LASER OPTICAL SYSTEM

(75) Inventor: Junichi Kodaira, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 406 days.

(21) Appl. No.: 11/900,266

(22) Filed: Sep. 11, 2007

(65) Prior Publication Data

US 2008/0297921 A1  Dec. 4, 2008

(30) Foreign Application Priority Data

Sep. 13, 2006 (JP) ............................. 2006-248131

(51) Int. Cl.
*G02B 7/02* (2006.01)
(52) U.S. Cl. ..................... 359/822; 359/813; 359/819
(58) Field of Classification Search ................. 359/822, 359/811, 813, 815, 819
See application file for complete search history.

(56) References Cited

U.S. PATENT DOCUMENTS 5,485,266 A   1/1996  Hirano et al.

2003/0229996 A1   12/2003  Tamamura

FOREIGN PATENT DOCUMENTS

| EP | 0 689 080 A1 | 12/1995 |
| JP | 6-026861 | 4/1994 |

*Primary Examiner*—Jessica T Stultz
*Assistant Examiner*—Brandi N Thomas
(74) *Attorney, Agent, or Firm*—Chapman and Cutler LLP

(57) ABSTRACT

An optical axis tilting device of a laser optical system, includes a lens barrel inside of which provided with a laser optical system; a tilt frame supported at the lens barrel; a tilt sensor which is provided at the tilt frame and is configured to detect a preset reference position of the tilt frame; a fixed frame fixed to the lens barrel and provided with a tilting mechanism which tilts the tilt frame relative to a horizontal plane; a leveling mechanism which supports the lens barrel tiltably, and tilts the lens barrel so as to detect the reference position by the tilt sensor and then levels the tilt frame; a feed screw which is rotatably driven by a driving motor; a feed piece which is reciprocated by the feed screw and engages with the tilt frame and tilts the tilt frame relative to the reference position; a piece position detection device configured to detect a position of the feed piece; and a computing device configured to calculate a tilting angle based on the position of the feed piece detected by the piece position detection device.

5 Claims, 5 Drawing Sheets

OPTICAL AXIS TILTING DEVICE OF LASER OPTICAL SYSTEM

PRIORITY CLAIM

The present application is based on and claims priority from Japanese Application Number 2006-248131, filed Sep. 13, 2006, the disclosure of which is hereby incorporated by reference herein in its entirety.

BACKGROUND OF THE INVENTION

1. Field of the Invention

The present invention relates to an optical axis tilting device of a laser optical system.

2. Description of Related Art

It is known that an optical axis tilting device of a laser optical system has been used as a tilt gradient setting device in, for example, a rotary laser survey equipment. It is known that, as a control means configured to control a setting amount of a tilting angle relative to horizontal or vertical of an optical axis of the laser optical system, the conventional optical axis tilting device of the laser optical system employs an encoder in its feed screw mechanism to detect a rotation speed of the feed screw mechanism, or an encoder in its driving motor which rotatably drives the feed screw.

JP H6-26861A discloses an optical axis tilting device of such a technique, which tilts the laser optical system from a horizontal position or a vertical position by driving the feed screw mechanism.

Moreover, it is also known an optical axis tilting device in which a tilt gradient of an optical axis of a laser optical system is set by tilting the laser optical system relative to a tilt sensor and leveling the whole optical axis tilting device.

However, in such the conventional optical axis tilting device of the laser optical system, the angle setting accuracy of the rotary laser survey equipment mainly depends on the accuracy of the feed screw mechanism, as a result of an accumulated error due to repetitive drives of a feed screw part of the feed screw mechanism, or a wear due to repetitive drives of the feed screw part, or a distortion of the feed screw part due to aged deterioration, etc., feed error occurs and causes deviation in angle setting, and thus a problem arises in that it is difficult to ensure tilting accuracy of the optical axis of the laser optical system.

SUMMARY OF THE INVENTION

An object of the invention is to provide an optical axis tilting device of a laser optical system, which is capable of ensuring a setting accuracy of a tilting angle relative to a horizontal or a vertical of an optical axis of the laser optical system, even there occurs a feed error which is resulted from the accumulated error due to repetitive drives of a feed screw part, or a wear due to repetitive drives of the feed screw part, or distortions of the feed screw part due to aged deterioration, etc.

In light of the above, an optical axis tilting device of a laser optical system according to an embodiment of the present invention includes: a lens barrel inside of which provided with a laser optical system; a tilt frame supported at the lens barrel which is tiltably in at least one of an XZ plane which contains an X-axis and a Z-axis, and a YZ plane which contains a Y-axis and the Z-axis, an optical axis of the laser optical system being the Z-axis, one of axes perpendicular to each other in a plane which is perpendicular to the Z-axis being the X-axis and another being the Y-axis; a tilt sensor which is provided at the tilt frame and is configured to detect a preset reference position of the tilt frame; a fixed frame fixed to the lens barrel and provided with a tilting mechanism which tilts the tilt frame relative to a horizontal plane; a leveling mechanism which supports the lens barrel tiltably, and tilts the lens barrel so as to detect the reference position by the tilt sensor and then levels the tilt frame; a feed screw included in the tilting mechanism which is rotatably driven by a driving motor; a feed piece included in the tilting mechanism, which is reciprocated by the feed screw and engages with the tilt frame and tilts the tilt frame relative to the reference position; a piece position detection device included in the tilting mechanism which is configured to detect a position of the feed piece; and a computing device which is configured to calculate a tilting angle based on the position of the feed piece detected by the piece position detection device.

DETAILED DESCRIPTION OF THE PREFERRED EMBODIMENTS

Preferable embodiments of an optical axis tilting device of a laser optical system according to the present invention will be described in detail with reference to the accompanying drawings.

Figure 1:
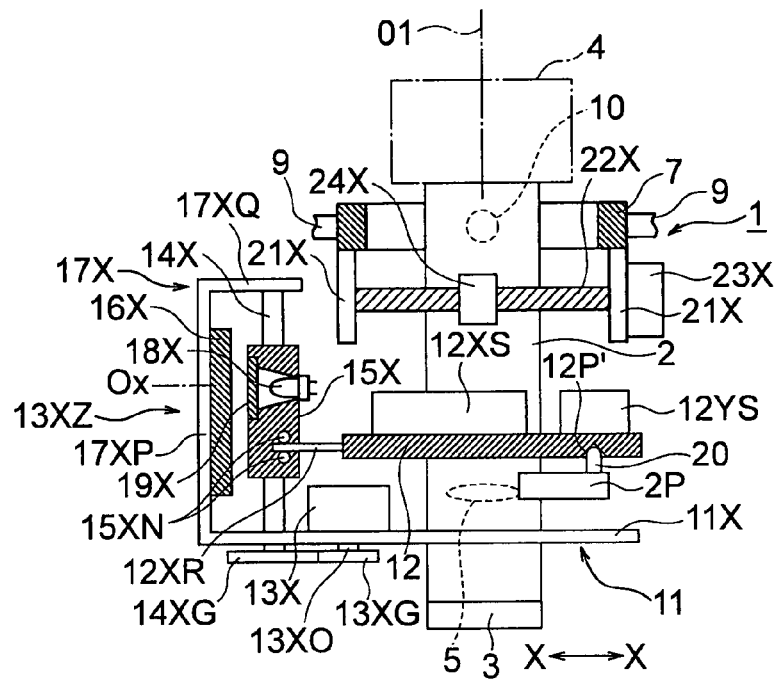
FIG. 1 is a schematic section view illustrating a tilting mechanism in an XZ plane of an optical axis tilting device of a laser optical system according to a first embodiment of the present invention.
Figure 2:
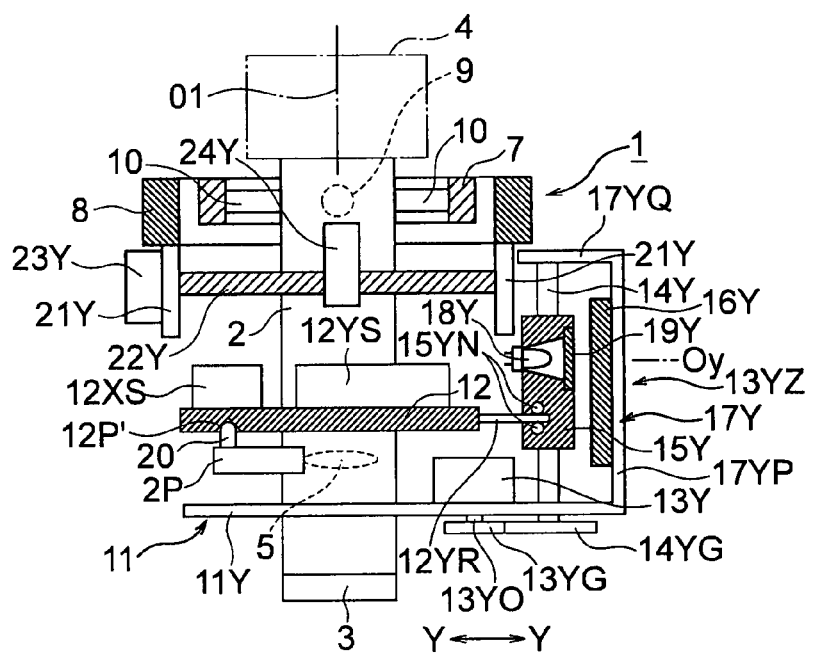
FIG. 2 is a schematic section view illustrating the tilting mechanism in a YZ plane of the optical axis tilting device of the laser optical system of the first embodiment.
Figure 3:
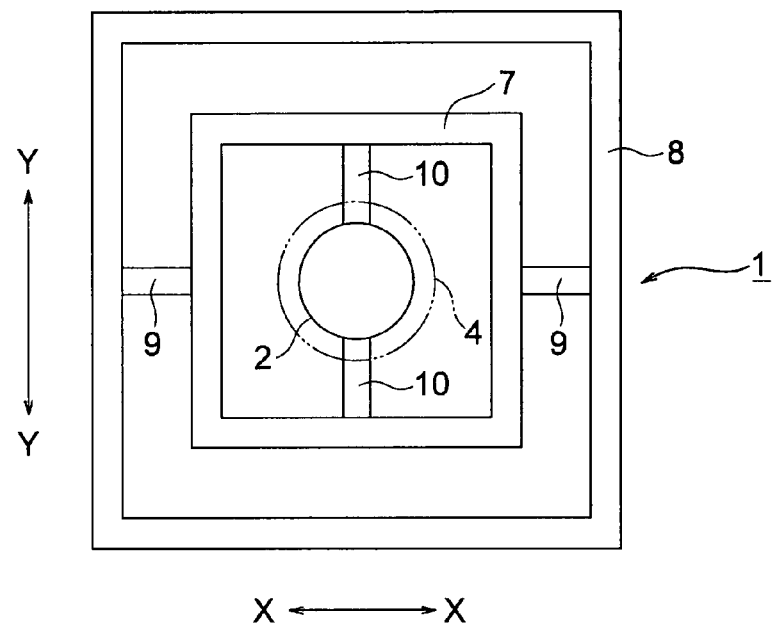
FIG. 3 is a schematic plan view illustrating a gimbal mechanism illustrated in FIGS. 1 and 2.

As illustrated in FIGS. 1 to 3, an optical axis tilting device of a laser optical system according to a first embodiment includes a gimbal mechanism 1 (leveling mechanism) and a lens barrel 2. A laser light source section 3 is provided at a lower portion of the lens barrel 2, and a rotating cylinder section 4, for example, is provided at an upper portion of the lens barrel 2.

An objective lens 5 is disposed between the laser light source section 3 and the rotating cylinder section 4 inside the lens barrel 2. A pentaprism (not illustrated) is disposed inside the rotating cylinder section 4. The laser optical system substantially includes the laser light source section 3 and the objective lens 5. A symbol O1 denotes an optical axis of the laser optical system. It is supposed that the direction of this optical axis O1 is Z-axis.

The objective lens 5 is used to transform light beams emitted from the laser light source section 3 into parallel light beams, or focus the light beams to a limited distance.

The rotating cylinder section 4 is driven by a rotary drive mechanism (not illustrated) to rotate relative to the lens barrel 2. The light beams emitted from the laser light source section 3 are deflected by the pentaprism, and are emitted outwards from a window (not illustrated) of the rotating cylinder section 4 while being rotated.

The gimbal mechanism 1 supports the lens barrel 2 tiltably and levels a tilt frame 12 to be described in the below, and as illustrated in FIG. 2, the gimbal mechanism 1 has a rectangular gimbal frame 7 and a rectangular gimbal frame 8. The gimbal frame 8 is fixed at a case (not illustrated).

The gimbal frame 8 has a pair of turning shafts 9, 9 extending along an X-axis which is perpendicular to the Z-axis, a direction perpendicular to the X-axis and the Z-axis being Y-axis.

The gimbal frame 7 is supported by the pair of turning shafts 9, 9, and is rotated in a YZ plane.

The gimbal frame 7 has a pair of turning shafts 10, 10 extending along the Y-axis.

The lens barrel 2 is supported by the pair of turning shafts 10, 10, and is rotated in an XZ plane.

Figure 4:
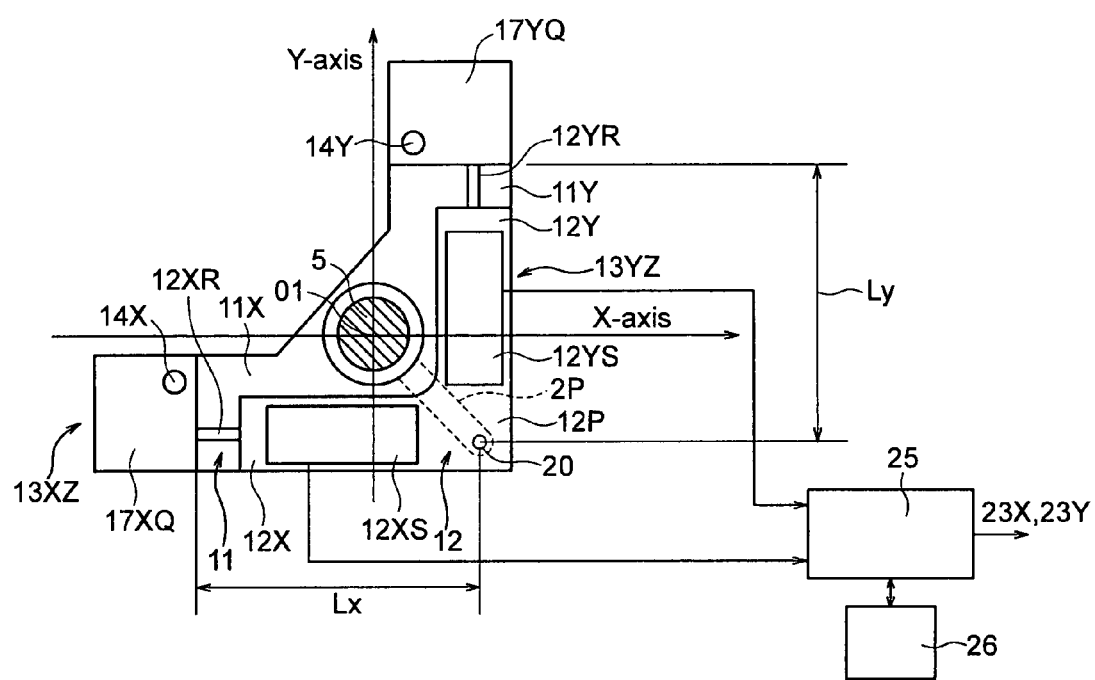
FIG. 4 is a plan view illustrating a relation among a tilt frame and a fixed frame and a lens barrel illustrated in FIGS. 1 and 2.

A transport mechanism frame (fixed frame) 11 is fixed to the lens barrel 2 at its lower portion. As illustrated in FIG. 4, this transport mechanism frame 11 has an X-axis arm section 11X extending along the X-axis, and a Y-axis arm section 11Y extending along the Y-axis.

An XZ tilting mechanism 13XZ is disposed at the X-axis arm section 11X, which relatively tilts the tilt frame 12 relative to the lens barrel 2 in the XZ plane. A YZ tilting device 13YZ is disposed at the Y-axis arm section 11Y, which relatively tilts the tilt frame 12 relative to the lens barrel 2 in the YZ plane.

As illustrated in FIG. 1, the XZ tilting mechanism 13XZ includes a feed motor 13X, a feed screw 14X, a feed piece member (feed piece) 15X, a CCD 16X as a position detection element, and a supporting frame 17X. The supporting frame 17X has a longitudinal wall section 17XP extending in a vertical direction, and a transversal wall section 17XQ extending in a transversal direction from the longitudinal wall section 17XP.

The feed screw 14X is pivotally supported to be capable of rotating by the longitudinal wall section 17XQ and the X-axis arm section 11X. The CCD 16X is fixed to the longitudinal wall section 17XP. The feed piece member 15X is screwed to the feed screw 14X. The CCD 16X faces the feed piece member 15X.

The X-axis feed motor 13X is fixed to the X-axis arm section 11X, and an output gear 13XG is disposed at an output shaft 13XO of the X-axis feed motor 13X.

A rotating transmission gear 14XG is disposed at a lower portion of the feed screw 14X and is engaged with the output gear 13XG.

Therefore, the feed screw 14X is rotatably driven by the X-axis feed motor 13X, and the feed piece member 15X is driven in the vertical direction (Z-axis direction) by the rotation of the feed screw 14X.

A LED 18X and an absolute pattern plate 19X, which are used as an absolute pattern, are disposed at the feed piece member 15X.

The LED 18X illuminates the absolute pattern plate 19X, and by the illuminating light an absolute pattern image is projected on an imaged reception surface of the CCD16X.

A vertical position of the feed piece member 15X depends on the absolute pattern image projected on the imaged reception surface of the CCD16X.

As illustrated in FIG. 2, a YZ tilting mechanism 13YZ has a feed motor 13Y, a feed screw 14Y, a feed piece member 15Y, a CCD 16Y as a position detection element, and a supporting frame 17Y.

The supporting frame 17Y has a longitudinal wall section 17YP extending in the vertical direction, and a transversal wall section 17YQ extending in the transversal direction from the longitudinal wall section 17YP.

The feed screw 14Y is pivotally supported to be capable of rotating by the transversal wall section 17YQ and Y-axis arm section 11Y. The CCD 16Y is fixed to the longitudinal wall section 17YP. The feed piece member 15Y is screwed to the feed screw 14Y. The CCD16Y faces the feed piece member 15Y.

The feed motor 13Y is fixed to the Y-axis arm section 11Y, and an output gear 13YG is disposed at an output shaft 13YO of the feed motor 13Y.

A rotating transmission gear 14YG is disposed at a lower portion of the feed screw 14Y and is engaged with the output gear 13YG.

Therefore, the feed screw 14Y is rotatably driven by the Y-axis feed motor 13Y, and the feed piece member 15Y is driven in the vertical direction by the rotation of the feed screw 14Y.

An LED 18Y and an absolute pattern plate 19Y, which are used as an absolute pattern, are disposed at the feed piece member 15Y.

The LED18Y illuminates the absolute pattern plate 19Y, and by the illuminating light an absolute pattern image is projected on an imaged reception surface of the CCD16Y. A vertical position of the piece member 15Y depends on the absolute pattern image projected on the imaged reception surface of the CCD16Y.

As illustrated in FIG. 4, the tilt frame 12 has an X-axis arm section 12X and a Y-axis arm section 12Y which are perpendicular to each other.

An X-axis tilt sensor 12XS is disposed at the X-axis arm section 12X, and a Y-axis tilt sensor 12YS is disposed at the Y-axis arm section 12Y.

An engagement rod 12XR extending along the X-axis is disposed at the X-axis arm section 12X, and an engagement rod 12YR extending along the Y-axis is disposed at the Y-axis arm section 12Y.

A pair of engagement claws 15XN, 15XN are disposed at the feed piece member 15X, at interval in the vertical direction (refer to FIG. 1). A pair of engagement claws 15YN, 15YN are disposed at the feed piece member 15Y, at intervals in the vertical direction (as seen in FIG. 2). The pair of engagement claws 15XN, 15XN engage with the engagement rod 12XR (refer to FIG. 1) and the pair of engagement claws 15YN, 15YN engage with the engagement rod 12YR (refer to FIG. 2).

As illustrated in FIG. 4, the lens barrel 2 is provided with an arm section 2P extending towards an intersection section 12P of the X-axis arm section 12X and the Y-axis arm section 12Y, and a pivot shaft 20 extending in the vertical direction is formed at this arm section 2P.

A conic taper concave part 12P' is formed at the intersection part 12P of the tilt frame 12. The pivot shaft 20 is engaged with the taper concave part 12P' (refer to FIG. 1 and FIG. 2).

The tilt frame 12 is supported by the pivot shaft 20 and the pairs of engagement claws 15XN, 15XN, 15YN, 15YN, and is tilted relative to the lens barrel 2 with the pivot shaft 20 being a supporting point, in the XZ plane and the YZ plane.

The X-axis tilt sensor 12XS and the Y-axis tilt sensor 12YS are able to detect a horizontal reference position (reference position) in which an absolute horizontal reference has been input. A detection output of any one of the sensors is input into a computing section (computing device) 25 illustrated in FIG. 4.

As illustrated in FIG. 1, a pair of bearing members 21X, 21X are disposed at the gimbal frame 7, at intervals in the direction of X-axis.

An X-axis leveling screw member 22X extending along the X-axis is rotatably supported at the pair of bearing members 21X, 21X.

An X-axis leveling motor 23X is fixed to one of the pair of bearing members 21X, 21X.

The X-axis leveling screw member 22X is driven to rotate by the X-axis leveling motor 23X.

An X-axis piece member 24X is screwed to the X-axis leveling screw member 22X. This X-axis piece member 24X is fixed to the periphery of the lens barrel 2.

As illustrated in FIG. 2, a pair of bearing members 21Y, 21Y are disposed at the gimbal frame 8, at intervals in the direction of Y-axis.

A Y-axis leveling screw member 22Y extending along the Y-axis is rotatably supported at the pair of bearing members 21Y, 21Y.

A Y-axis leveling motor 23Y is fixed at one of the pair of bearing members 21Y, 21Y.

The Y-axis leveling screw member 22Y is driven to rotate by the Y-axis leveling motor 23Y.

A Y-axis piece member 24Y is screwed to the Y-axis leveling screw member 22Y. This Y-axis piece member 24Y is fixed to the gimbal frame 7.

When the X-axis leveling motor 23X is driven to rotate, the X-axis leveling screw member 22X is driven to rotate, whereby the X-axis piece member 24X is transferred in the direction of the X-axis, and the lens barrel 2 is tilted with the turning shafts 10, 10 being supporting points, in the XZ plane.

On the other hand, when the Y-axis leveling motor 23Y is driven to rotate, the Y-axis leveling screw member 22Y is driven to rotate, whereby the Y-axis piece member 24Y is transferred in the direction of the Y-axis, and the lens barrel 2 is tilted with the turning shafts 9, 9 being supporting points, in the YZ plane.

The lens barrel 2 is set such that the optical axis O1 faces the vertical direction by a device not illustrated in the drawings. The tilt frame 12 is set horizontally by each of the tilting mechanisms 13XZ, 13YZ during the manufacturing process by driving the feed piece members 15X, 15Y.

A detection position of the absolute pattern image corresponding to a horizontal position during the manufacturing process is regarded as original point positions Ox, Oy. An original point signal corresponding to the original point positions Ox, Oy is stored in a memory unit 26 via the computing section 25.

Therefore, a vertical relationship between the optical axis O1 and the tilt frame 12 is set during the manufacturing process.

In a state in which the vertical relationship is set, the lens barrel 2 is set to the case through the gimbal mechanism 1.

In the case that the optical axis O1 of the laser optical system is set at a desired angle with respect to the horizontal plane, for example, the following setting operations are performed.

For example, the tilt frame 12 is set to the desired angle by operating a tilting angle setting button (not illustrated), driving the feed motors 13X, 13Y, and moving the feed piece members 15X, 15Y.

The computing section 25 detects offsets Δx, Δy of the feed piece members 15X, 15Y deviating from the original point positions Ox, Oy, based on the position of the absolute pattern image and the original point position stored in the memory unit 26.

As illustrated in FIG. 4, if a distance from the pivot shaft 20 to a front end of the engagement rod 12XR in the direction of the X-axis is Lx and a distance from the pivot shaft 20 to a front end of the engagement rod 12YR in the direction of the Y-axis is Ly, then a tilting angle θx of the tilt frame 12 in the XZ plane and a tilting angle θy of the tilt frame 12 in the YZ plane are calculated by the computing section 25 using the following formulas:

$$\theta x = \tan^{-1}(\Delta x/Lx)$$

$$\theta y = \tan^{-1}(\Delta y/Ly)$$

These tilting angles θx, θy of the tilt frame 12 are, for example, displayed on a screen of a monitor (not illustrated).

The tilting angle setting button is operated until the tilting angles θx, θy of the tilt frame 12 reach the desired degrees, and at the time that the desired degrees are reached, the movement of the feed piece members 15X, 15Y are stopped.

Figure 5:
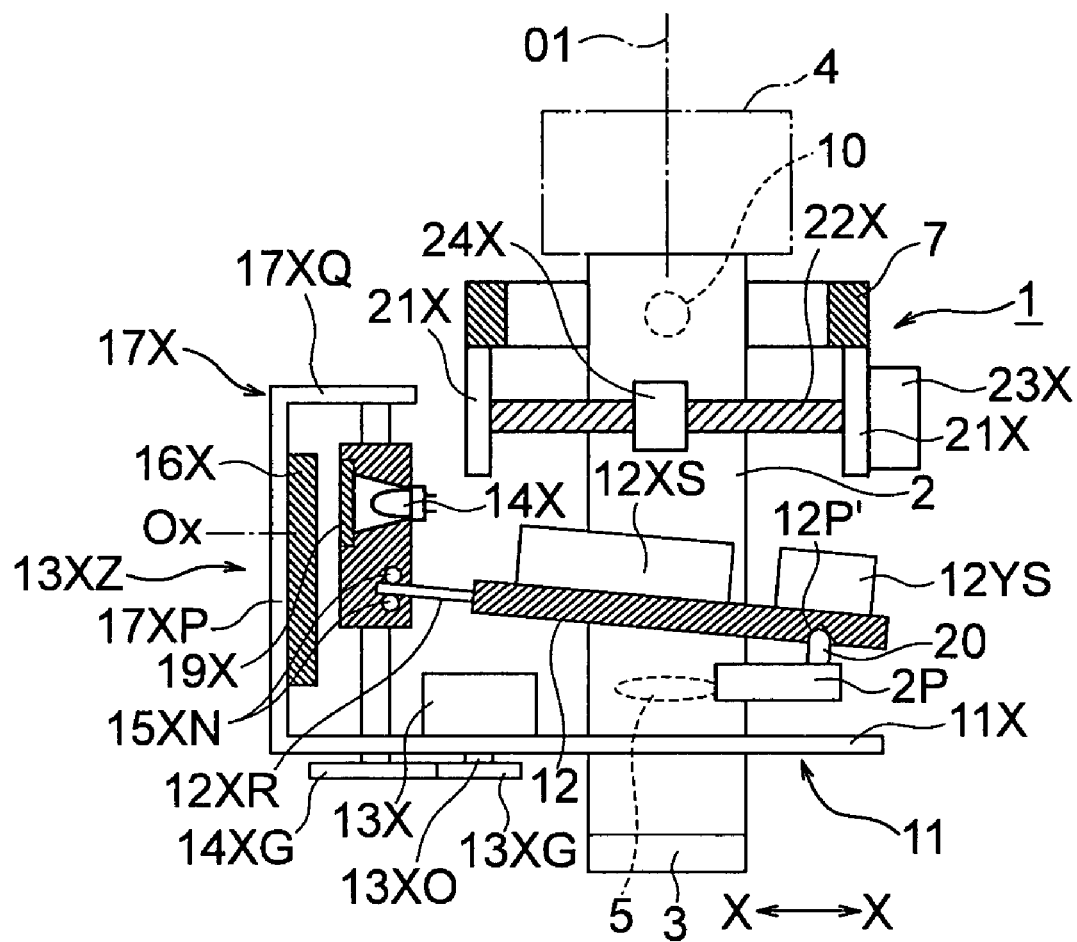
FIG. 5 is a section view illustrating tilting action in the XZ plane of the optical axis tilting device of the laser optical system according to the first embodiment.

Thus, the tilt frame 12, as illustrated in FIG. 5, is set to tilting angles corresponding to the tilting angles θx, θy with respect to the horizontal plane.

The X-axis tilt sensor 12XS and the Y-axis tilt sensor 12YS output tilt signals which are proportional to the tilting angle of the tilt frame 12 with respect to the horizontal plane, to the computing section 25.

The computing section 25 drives the X-axis leveling motor 23X and the Y-axis leveling motor 23Y so that the outputs of the X-axis tilt sensor 12XS and the Y-axis tilt sensor 12YS become "0".

Thus, the lens barrel 2 is tilted in the XZ plane with the turning shafts 10, 10 being supporting points and tilted in the YZ plane with the turning shafts 9, 9 being supporting points, to make the tilt frame 12 to be horizontal.

As a result, the optical axis O1 of the laser optical system is tilted θx degrees in the XZ plane and θy degrees in the YZ plane.

That is to say, the gimbal mechanism 1 functions as a leveling mechanism which levels the tilt frame 12 (i.e. adjusts the tilt frame 12 to a horizontal position). The tilt frame 12 is tiltable in an XZ plane which contains an X-axis and a Z-axis, and in a YZ plane which contains a Y-axis and a Z-axis, assuming that one of axes perpendicular to each other in a plane which is perpendicular to the Z-axis (optical axis O1) being the X-axis and another axis being the Y-axis.

According to the invention, the actual positions of the feed piece members 15X, 15Y which tilt the tilt frame 12 are detected, therefore the tilting angle setting accuracy relative to the horizontal and the vertical of the optical axis of the laser optical system can be ensured, even the accumulated error due to the repetitive drives of the feed screws 14X, 14Y, the wear due to the repetitive drives of the feed screws 14X, 14Y, the loosening of the feed screws 14X, 14Y due to their distortion resulting from aged deterioration.

As described above, in the first embodiment of the present application, as position detection elements, the CCD 16X, 16Y are used to detect the position of the absolute pattern image. In addition, it is possible to be configured to use PSD as a position detection element to detect the position of the absolute pattern image.

Besides, it is also possible to use a resistance element (a linear sensor) such as a slide volume as a position detection element, to detect the positions of the feed piece members 15X, 15Y.

Additionally, in the first embodiment of the present invention, the absolute pattern plates 19X, 19Y are provided at the feed piece members 15X, 15Y, and the position detection elements (CCD16X, 16Y) are provided at the longitudinal wall sections 17XP, 17YP. However, it is also possible to provide the position detection elements (CCD16X, 16Y) at the feed piece members 15X, 15Y, and provide the absolute patterns (LED 18X, 18Y and the absolute pattern plates 19X, 19Y) at the longitudinal wall sections 17XP, 17YP.

Moreover, in the first embodiment of the present invention, the tilt frame 12 is supported by the pivot shaft 20 and is tiltable in the XZ plane with the pivot shaft 20 being the supporting point, and is tiltable in the YZ plane with the pivot shaft 20 being the supporting point. However, it is also possible to employ a structure such that the tilt frame 12 is tiltable in any one of the XZ plane and the YZ plane.

Figure 6:
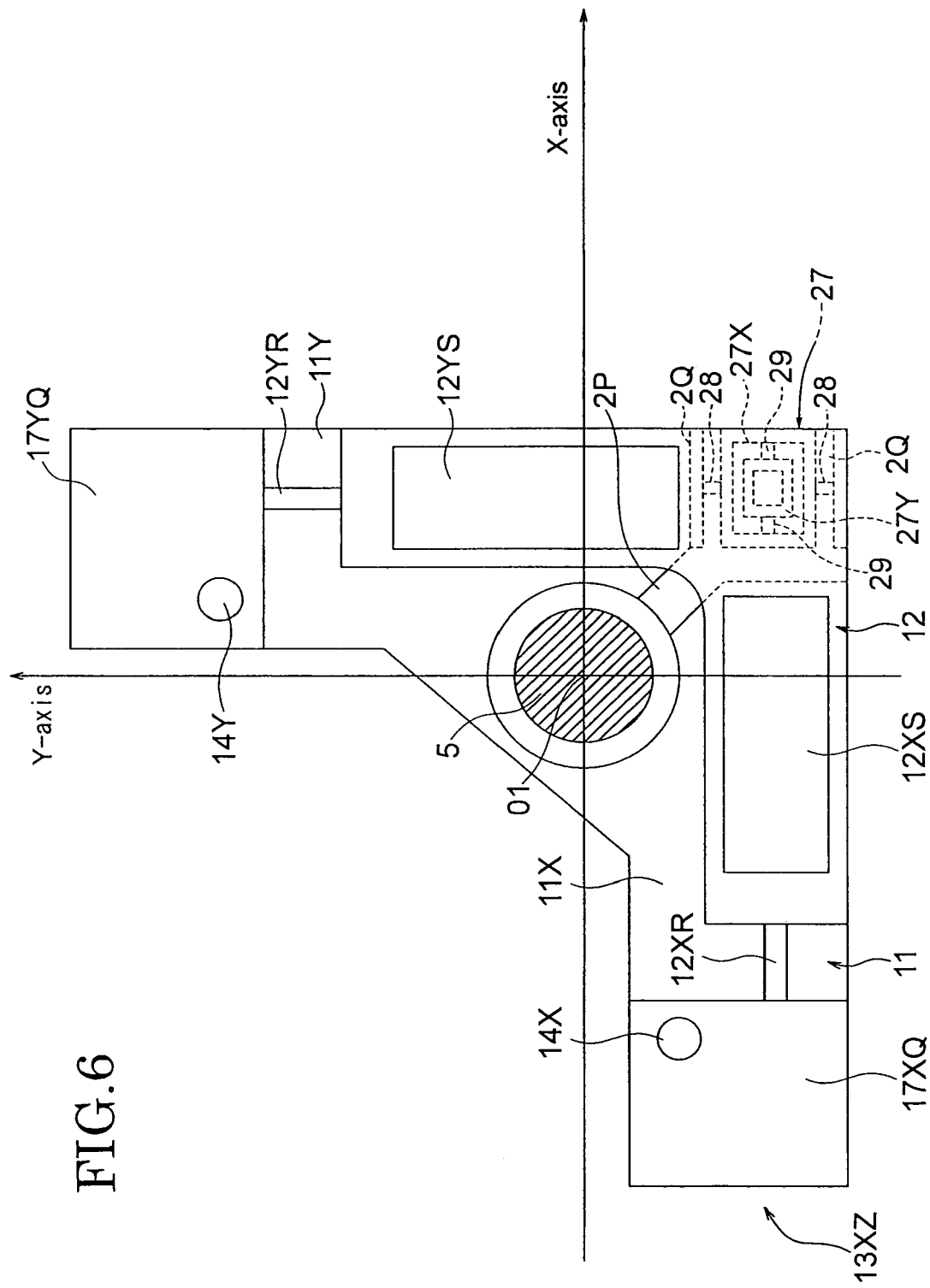
FIG. 6 is a plan view illustrating an optical axis tilting device of the laser optical system according to a second embodiment of the invention, a tilt frame being supported by a gimbal mechanism.
Figure 7:
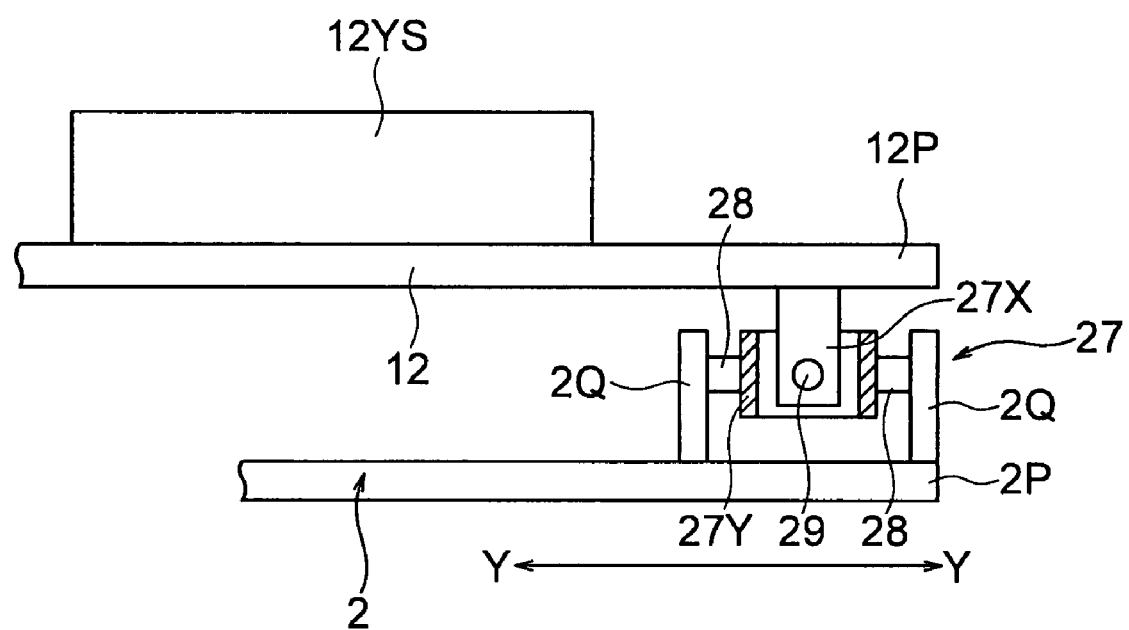
FIG. 7 is an enlarged view illustrating detailed structures of a tilt frame and an arm section illustrated in FIG. 6, viewed from a direction of an X-axis.

Furthermore, in the first embodiment of the present invention, the tilt frame 12 is tilted with the pivot shaft 20 being the supporting point. However, as illustrated in FIG. 6 and FIG. 7, in the second embodiment of the present invention, it is also possible that the tilt frame 12 is supported by a gimbal mechanism 27.

In the second embodiment of the present invention, for example, the gimbal mechanism 27 includes a gimbal frame 27X and a gimbal frame 27Y.

The gimbal frame 27X is supported rotatably at the lens barrel 2 through a pair of turning shafts 28, 28 disposed at a pair of supporting walls 2Q, 2Q which are vertically disposed at the arm section 2P.

The gimbal frame 27Y is supported rotatably at the lens barrel 2 through a pair of turning shafts 29, 29, and is fixed to the intersection part 12P of the tilt frame 12. The tilting action of the gimbal mechanism 27 is substantively same as that of the gimbal mechanism 1, and thus the detailed explanation of it is omitted.

Although the preferred embodiments of the present invention has been described in terms of exemplary embodiments, it should be noted that the present invention is not limited to these embodiments, various modifications and changes may be made to the embodiments by those skilled in the art without departing from the scope of the present invention as defined by the following claims.

What is claimed is:

1. An optical axis tilting device of a laser optical system, comprising:
   a lens barrel in which a laser optical system is disposed;
   a tilt frame which is tiltably supported on the lens barrel in at least one of an XZ plane which contains an X-axis and a Z-axis and a YZ plane which contains a Y-axis and the Z-axis, an optical axis of the laser optical system being the Z-axis, one of axes perpendicular to each other in a plane which is perpendicular to the Z-axis being the X-axis and an other being the Y-axis;
   a tilt sensor which is provided at the tilt frame and is configured to detect a preset reference position of the tilt frame;
   a fixed frame fixed to the lens barrel and provided with a tilting mechanism which tilts the tilt frame relative to a horizontal plane;
   a leveling mechanism which supports the lens barrel tiltably, and tilts the lens barrel so as to detect the reference position by the tilt sensor and then levels the tilt frame;
   a feed screw included in the tilting mechanism which is rotatably driven by a driving motor;
   a feed piece included in the tilting mechanism, which is reciprocated by the feed screw and engages with the tilt frame and tilts the tilt frame relative to the reference position;
   a piece position detection device included in the tilting mechanism which is configured to detect a position of the feed piece; and
   a computing device which is configured to calculate a tilting angle based on the position of the feed piece detected by the piece position detection device.

2. The optical axis tilting device of the laser optical system according to claim 1, wherein the tilt frame is supported tiltably at the lens barrel with a pivot shaft being a supporting point.

3. The optical axis tilting device of the laser optical system according to claim 1, wherein the tilt frame is supported tiltably at the lens barrel through a gimbal mechanism.

4. The optical axis tilting device of the laser optical system according to claim 1, wherein the piece position detection device includes an absolute pattern illuminated by illuminating light, and a position detection element which is configured to receipt a projected image of the absolute pattern illuminated by the illuminating light, either the absolute pattern or the position detection element is provided at the feed piece, and the other which is not provided at the feed piece is disposed at the fixed frame.

5. The optical axis tilting device of the laser optical system according to claim 1, wherein the piece position detection device includes a linear sensor.

* * * * *